United States Patent
Graves, Jr. et al.

(10) Patent No.: US 11,042,479 B2
(45) Date of Patent: Jun. 22, 2021

(54) FULLY ACTIVE AND NON REPLICATED BLOCK STORAGE SOLUTION

(71) Applicant: Oracle International Corporation, Redwood Shores, CA (US)

(72) Inventors: Donald Allan Graves, Jr., Manchester, NH (US); Frederick S. Glover, Hollis, NH (US); Alan David Brunelle, Merrimack, NH (US); Pranav Dayananda Bagur, Nashua, NH (US); James Bensson, Hollis, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 16/242,957

(22) Filed: Jan. 8, 2019

(65) Prior Publication Data
US 2020/0218656 A1    Jul. 9, 2020

(51) Int. Cl.
*G06F 12/0808*   (2016.01)
*G06F 12/084*    (2016.01)

(52) U.S. Cl.
CPC ........ *G06F 12/0808* (2013.01); *G06F 12/084* (2013.01); *G06F 2212/1044* (2013.01); *G06F 2212/608* (2013.01)

(58) Field of Classification Search
CPC .............. G06F 12/0808; G06F 12/084; G06F 2212/1044; G06F 2212/608; G06F 2212/683
See application file for complete search history.

(56) References Cited

U.S. PATENT DOCUMENTS

| | | | | |
|---|---|---|---|---|
| 2002/0078305 | A1* | 6/2002 | Khare | G06F 12/0808 711/144 |
| 2009/0106404 | A1* | 4/2009 | Christenson | H04L 29/12952 709/222 |
| 2011/0320738 | A1* | 12/2011 | Blake | G06F 12/0815 711/141 |
| 2014/0281266 | A1* | 9/2014 | Johnson | G06F 12/0815 711/141 |
| 2015/0169497 | A1* | 6/2015 | Fried | G06F 12/0831 709/214 |
| 2018/0343228 | A1* | 11/2018 | Wei | H04L 61/6022 |
| 2019/0045007 | A1* | 2/2019 | Wyatt | G06F 11/008 |

* cited by examiner

*Primary Examiner* — Jane Wei
(74) *Attorney, Agent, or Firm* — Hickman Becker Bingham Ledesma LLP

(57) ABSTRACT

Techniques are provided for providing a fully active and non-replicated block storage solution in a clustered filesystem that implements cache coherency. In a clustered filesystem where one or more data blocks are stored in a respective cache of each host node of a plurality of host nodes, a request is received at a host node of the plurality of host nodes from a client device to write the one or more data blocks to a shared storage device. In response to the request, the one or more data blocks are stored in the cache of the host node and a particular notification is sent to another host node of the plurality of host nodes that the one or more data blocks have been written to the shared storage device. In response to receiving the notification, the other host node invalidates a cached copy of the one or more data blocks in the respective cache of the other host node.

12 Claims, 5 Drawing Sheets

FULLY ACTIVE AND NON REPLICATED BLOCK STORAGE SOLUTION

FIELD OF THE INVENTION

The present invention relates to file systems and, more particularly, to managing a cluster of nodes that implement cache coherency.

BACKGROUND

In today's industry, there are several types of coherent multi-path to block storage solutions. In an Active-Active block storage framework, generally only one to two pathways through host nodes to a defined block storage resource are active at a time. A pathway, as referred to herein, is a method of accessing a node using a wired or wireless connection. For example, a pathway may comprise a network or storage pathway. A network pathway is a method of a client accessing a host network cluster via wired or wireless connection. A storage pathway is a method of a host server cluster node or nodes accessing storage via wired or wireless connection. Multi-pathing refers to having multiple pathways to same object or node.

Both pathways are capable of servicing block storage requests for different data blocks at the same time. The advantage of an Active-Active design is that when the system is working properly, the available storage processing power of the host nodes is maximized, allowing the system to deliver better performance or support more workloads. However, during a failure of one pathway through a host node, all of the I/O must be handled by the surviving host node until the failed host node is replaced.

Additionally, there is a limit to the amount of scaling available, as coordinating storage access for both active host nodes often require a third node that handles and routes storage requests. Thus, speed is often limited by the server computer hardware, not the storage hardware.

In an Active-Passive block storage framework, only one pathway through a host node to a defined block storage resource is active at a time. If the active pathway fails, the passive pathway assumes responsibility for servicing client requests. If a host node fails, the same processing power becomes available from the standby host node and there is no drop in performance. The downside to an active-passive design is that a "failed state" is not normal, meaning the passive host node is idle for most of its life. As a result, the idling compute processing the passive is wasted.

Additionally, Active-Passive framework provides only one pathway through a host node at a time, with no scaling of access speed and generally only provides simple failover models.

In an Active with Replication block storage framework, a small number of pathways through host nodes to a defined block storage resource are active at a time. Each time a data block is written to, the data block is replicated locally among the host nodes on a defined replication network. The host nodes coordinate data access and replication by means of a cluster manager. These types of storage frameworks are rare and are based on a distributed storage system such as Ceph or Red Hat Gluster.

While Active with Replication allows for two or more pathways to continue to add increased speed to storage access, eventually the sum total of the pathways through the host nodes overwhelms the ability to replicate data blocks between nodes and coordinate client data access. Thus, active pathways are generally limited to two or three at a time. In addition, should data not be replicated from the node it was just written to, and should that host node experience a failure, data can be lost. Access latencies are generally very poor when this setup is used, making this framework infeasible for some applications.

Thus, in the industry today, there exists an issue—providing highly scalable block storage protocols over more than a few nodes, with large scale high-availability built in. This is compounded by ever increasing storage speeds overloading a single remote connection to a client.

In order to meet both the goals of high availability and storage speed, a new approach is needed to allow for multiple pathways to interact with the same storage devices, while not depending on replication between pathway endpoints. This approach would remove additional storage interactions and limitations of current scale-out storage systems, while maintaining the high availability aspects that are necessary in an enterprise environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
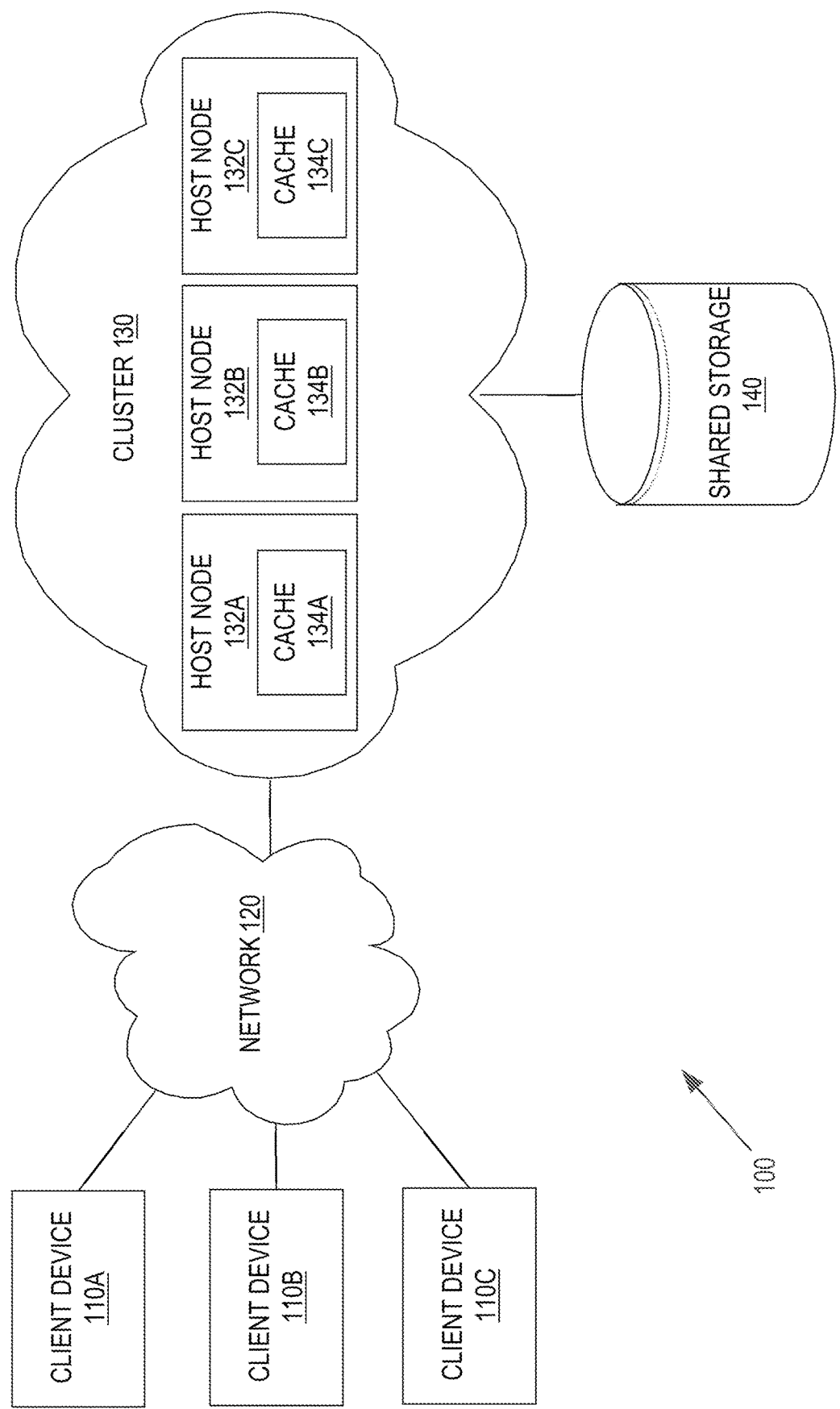
FIG. 1 is a block diagram that depicts an example coherent clustered file system architecture, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for providing a fully active and non-replicated block storage solution in a clustered filesystem that implements cache coherency. In a coherent clustered filesystem, clients interact with endpoints associated with a plurality of host nodes, which in turn provide access to shared storage. Each host node of the plurality of host nodes implements a cache, and data blocks are stored in a respective cache of each host node of a plurality of host nodes. Cache coherency is maintained between the plurality of host nodes. Consistency of the data within each cache on host nodes is managed using a distributed lock manager and a cache coherency protocol.

Each host node participates with the other host nodes in shared storage updates, so that each host maintains a fully updated copy or map of the storage available to all hosts. When a host node receives a request to write one or more data blocks from a client, the one or more data blocks are stored in the cache of the host node and a notification is sent to another host node of the plurality of host nodes that the one or more data blocks have been written to the shared storage device. When the other host node receives the notification, the other host node invalidates a cached copy of the one or more data blocks in the respective cache of the other host node.

When the other host node receives a request from a client to read the one or more data blocks, the other host node determines that the cached copy of the one or more data blocks in the cache of the other host node is invalid. The other host node reads the one or more data blocks from the shared storage device and transmits the one or more data blocks to the client device. Thus, all data block updates are done at the shared storage level and are efficiently communicated to other host nodes using a lightweight notification protocol which increases the availability of the system, allowing for more uptime to service client requests. Because of the efficient notification system, shared storage can be accessed over multiple pathways by a single client or by multiple clients. Additionally, each host node added to the set of host nodes increases the number of endpoints and bandwidth available to service client requests in a linear fashion, allowing for clients to utilize the full bandwidth of the shared storage.

These techniques overcome the deficiencies of Active-Active, Active-Passive, and Active with replication block storage frameworks to provide high-availability and scalability for a coherent cluster.

Clustered Filesystem with Cache Coherency

FIG. 1 is a block diagram that depicts an example clustered file system architecture 100, according to an embodiment of the invention. Clustered file system architecture 100 comprises client devices 110A-C, network 120, cluster 130, and shared storage 140. Although only three client devices 110A-C are depicted, other embodiments of the invention may include more or less than three.

Client devices 110A-C are configured to generate and transmit file system requests that are sent over network 120 and directed to cluster 130 and processed against shared storage 140. Common file system requests are read and write requests. Client devices 110A-C utilize endpoints, as described herein, to connect to the remote shared storage 140. A client can connect to one or more endpoints at any host nodes 132A-C and utilizes control software to determine how to best manage the flow of packets over all available endpoints to ensure maximum speed and reliability. Additionally, one or more client applications might execute on each of client devices 110A-C. Such client applications initiate the file system requests, which are generated by a file system client (e.g., NFS client) executing on a client device and sent to cluster 130.

Client devices 110A-C are configured to run controlling software that implements a multi-pathing algorithm, which analyzes the characteristics of the pathways available to the endpoints and determines which pathway to use to interact with the shared storage 140.

Figure 3:
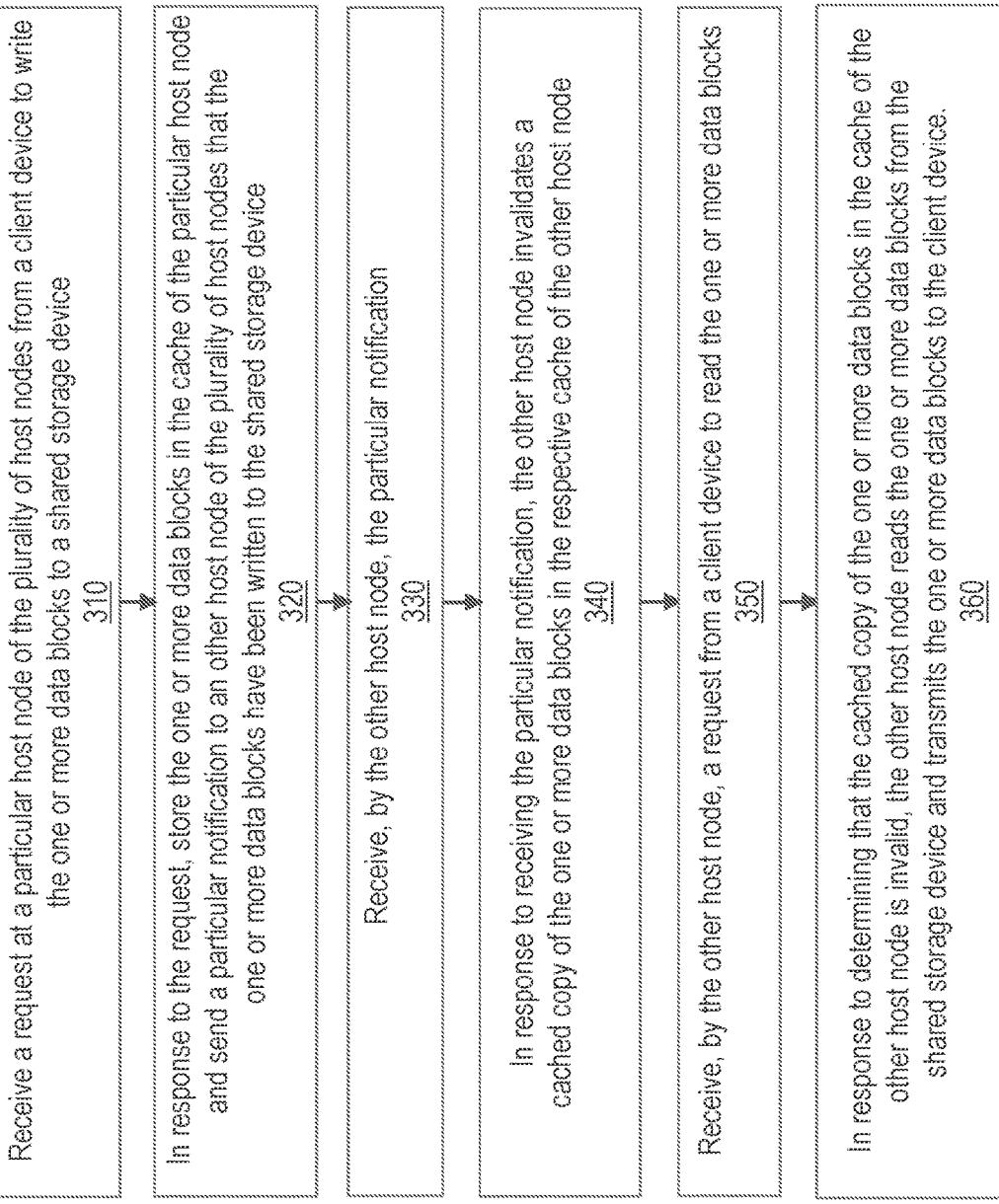
FIG. 3 is a flow diagram that depicts a procedure for providing a fully active, non-replicated block storage solution, according to an embodiment of the invention.

Network 120 may be implemented by any medium or mechanism that provides for the exchange of data between client devices 110A-C and cluster 130 of FIG. 3. Examples of a network include, without limitation, a network such as a Local Area Network (LAN), Wide Area Network (WAN), Ethernet or the Internet, or one or more terrestrial, satellite or wireless links.

Cluster 130 includes host nodes 132A-C. Although only three host nodes 132A-C are depicted, other embodiments of the invention may include more or less than three. Each of host nodes 134A-B includes one or more processors and a cache memory 134A-C. Each node in host nodes 132A-C is configured to process file systems requests against the respective cache memory 134A-C of each node and the shared storage 140.

In general, host nodes 132A-C are opaque to client devices. A client device 110A-C does not know which host it is interacting with, merely that it is interacting with an endpoint at a host node 132A-C. Each host node 132A-C fully participates with other host nodes 132A-C in storage updates, so that each host maintains a fully updated copy or map of the shared storage 140 available to all host nodes 132A-C. In this system architecture, there is no limit to the number of endpoints per host node.

Each host node 132A-C in cluster 130 is associated with an endpoint, which is generally implemented as a virtual address (referred to herein as a "VIP"). The endpoints are for clients to interact with, allowing clients to access the shared storage of the host nodes over preexisting industry standard block transport protocols, such as iSCSI. The address is "virtual" because the assignment of a VIP to one host node may change. For example, host node 132A may be associated with a particular VIP at time 10. Later, at time 20, the particular VIP is assigned to host node 132B. Thus, each file system request sent to the particular VIP would be routed to host node 132B, instead of host node 132A. More information about clustered filesystems can be found, for example, in U.S. Pat. Nos. 9,813,491 and 9,923,958, the entire contents of which are incorporated herein.

The VIP assigned to one host node may change based on a variety of factors. Non-limiting examples of such factors include cache considerations (e.g., whether a particular node in host nodes 134A-B has already processed a file system request that is from the same client device and that targets the same file system), the current load of each of host nodes 134A-B, the type of file system request(s) each of host node 134A-B is processing and/or queuing, the type of client application that initiated the file system request(s), whether a host node is experiencing or experienced critical storage failures, and/or the type of storage attached to the host node (e.g., direct, network, SSD, etc.).

The host nodes 134A-C in cluster 130 are configured to run host controlling software. The host controlling software generally executes on a master node in the set of host nodes 134A-C and determines where the endpoints are instantiated. The master node may decide to move an endpoint for many reasons, as discussed above, such as load balancing, availability, etc. The switching of endpoints is opaque to the client devices.

Host nodes 132A-C read and modify data in shared storage 140. Each node has a cache 134A-C to hold data in volatile memory and may be backed up by non-volatile shared disk storage. Cache coherency is maintained between host nodes 132A-C. Consistency of the data within each cache on host nodes 132A-C is managed using a distributed lock manager and a cache coherency protocol. A distributed lock manager is a system that provides a mechanism by which data may be synchronized to avoid clashes and corruptions when multiple nodes may have access to the same shared storage data blocks. A cache coherency protocol is a mechanism that assures that copies of a data item in multiple caches are valid copies. The protocol may involve, for example, nodes invalidating copies in a cache when another node changes a copy in its cache.

Shared storage 140 is addressed by any of host nodes 132A-C at the block level. In an embodiment, shared storage 140 comprises a storage area network (SAN). Each of host nodes 132A-C is connected to shared storage 140 over a high-speed network, such as a fiber channel network available from Infiniband. Each of host nodes 132A-C may access the shared storage 140 through a layer that understands the storage is shared (e.g. shared access method, cluster membership, shared distributed lock manager, shared membership). For example, each of host nodes 132A-C may access shared storage 140 through a block-based interface using iSCSI. If a data block of shared storage 140 is changed by one of the host nodes 132A-C, each other host node 132A-C may be notified of the updated data blocks, to ensure that all host nodes see an accurate view of the shared storage 140.

Figure 2:
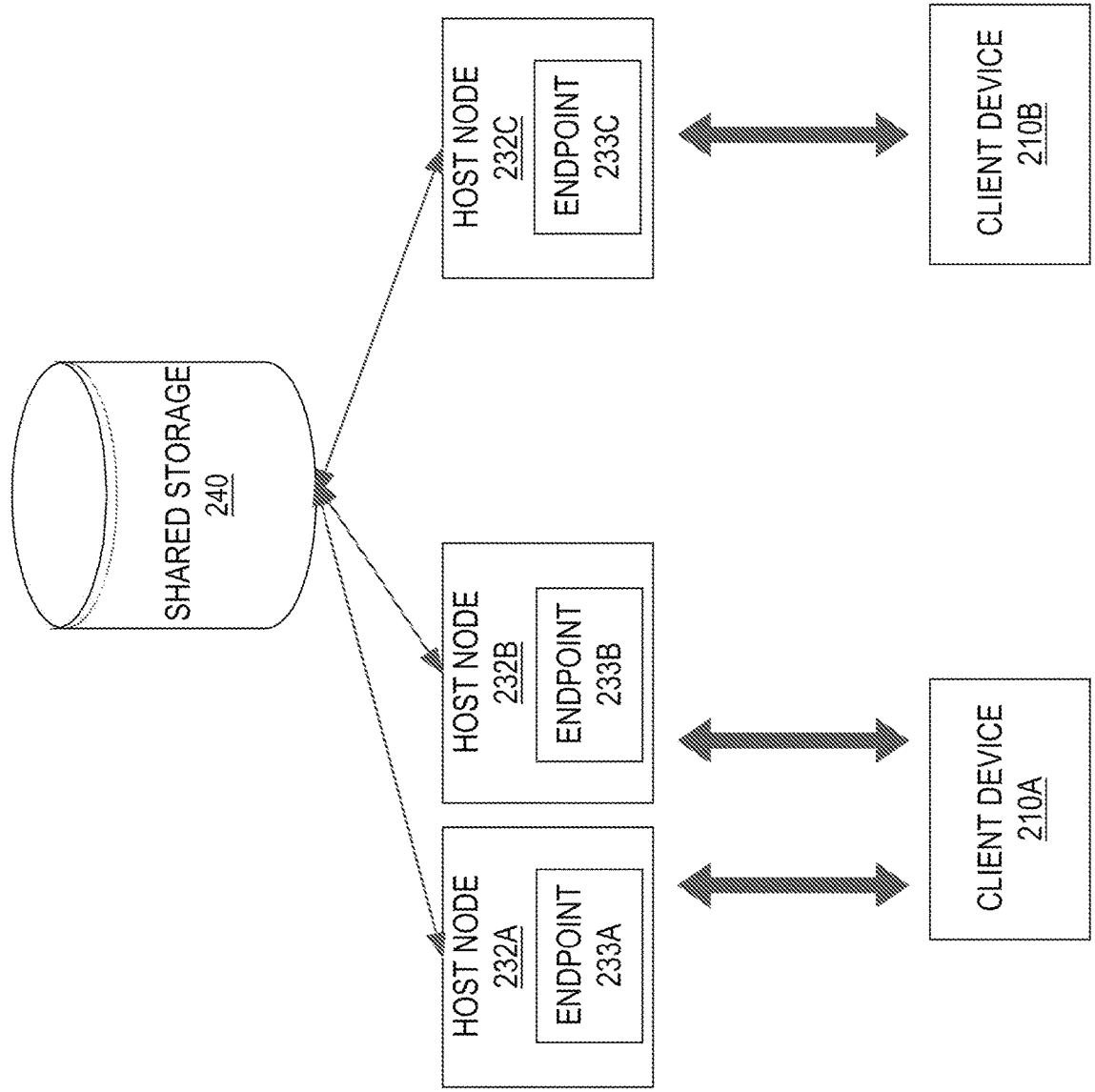
FIG. 2 is a block diagram that depicts a client device connected to two different endpoints with multiple pathways.

As an example of the functionality of the file system architecture of FIG. 1, FIG. 2 illustrates a client device 210A that is connected to two different endpoints 233A-B with multiple pathways. A single client device 210A may be connected to two different endpoints by way of two different pathways. As discussed previously, each host node 232A-C is associated with an endpoint 233A-C, and each endpoint 233A-C is implemented as a VIP, allowing clients to access the shared storage of the host nodes over block transport protocols, such as iSCSI.

The VIP associated with each endpoint 233A-C may change at any time. For example, if the host controlling software running on a master node determines that a host node 232A-C is experiencing or experienced critical storage failures, the master node may assign the VIP associated with that host node to a different host node so that client requests are delivered through a different host node that is more capable of servicing the client requests. Because the switching of endpoints is opaque to the client devices 210A-B, the client device interacts with a VIP and has no knowledge of which host node it is interacting with. A mapping may be maintained by a name server that maps each host node of the plurality of host nodes to virtual IP addresses.

Each pathway may be operating with no delays, allowing the client device to utilize both pathways to interact with the shared storage 240. However, if one of the pathways experiences data transfer slowdowns or drops out altogether, the client controlling software can choose to send more data packets down the other pathway or can decide to stop sending data packets altogether. The controlling software can be as sophisticated as a custom Bayesian network, or as simple as an round-robin algorithm.

Fully Active Non-Replicated Block Storage Solution

FIG. 3 is a flow diagram that depicts a procedure 300 for providing a fully active, non-replicated block storage solution, according to an embodiment of the invention. The steps in process 300 may be performed by host controlling software executing on each of host nodes 132A-C.

According to an embodiment of the invention, each host node of plurality of host nodes receives a respective request from client devices to write one or more data blocks to a shared storage device. Each client device request is sent to a respective single virtual IP address. In response to receiving the requests from the host nodes, the one or more data blocks are stored in a respective cache of each host node of the plurality of host nodes. As the one or more data blocks are propagated to storage in the shared storage device, the plurality of host nodes are notified that the one or more data blocks have been written to the shared storage device. Thus, multiple host nodes store the one or more data blocks in their respective caches and also implement cache coherency between the caches of each host node.

At step 310, a particular host node receives a request from a client device to write the one or more data blocks to a shared storage device.

At step 320, in response to receiving the request from the client device to write the one or more data blocks to the shared storage device, the particular host node stores the one or more data blocks in the cache of the particular host node and sends a particular notification to another host node of the plurality of host nodes that the one or more data blocks have been written to the shared storage device.

In an embodiment, a distributed locking mechanism is used to send notifications to participating nodes that one or more data blocks have been written to the shared storage device. In response to receiving the request from the client device to write the one or more data blocks to the shared storage device, the particular host node receives a lock for the one or more data blocks. By receiving the lock, the plurality of nodes are notified that the particular host node has the lock for the one or more data blocks. Once the particular host node writes the one or more data blocks in the cache of the particular host node or to the shared storage device, the lock is released. Upon releasing the lock, the other host node of the plurality of host nodes is notified that the one or more data blocks have been written to the shared storage device.

In an embodiment, the other host node determines, based on the lock being released by the particular host node, that the cached copy of the one or more data blocks in its cache is invalid. In response to determining that the cached copy of the one or more data blocks in the cache of the other host node is invalid, the other host node reads the one or more data blocks from the shared storage device and transmits the one or more data blocks to the client device. The other host node may also store the one or more data blocks from the shared storage device in the cache of the other host node and store an indication that the cached copy of the one or more data blocks in the cache of the other host node are valid.

In an embodiment, the host node sends a particular notification to each host node of the plurality of host nodes that includes a cached copy of the one or more data blocks in their respective caches. That is, each host node of the plurality of host nodes that has a cached copy of the one of more data blocks in their respective caches receives the notification. Each host node of the plurality of host nodes that do not include a cached copy of the one or more data blocks in their respective caches do not receive the particular notification.

At step 330, the other host node receives the particular notification.

At step 340, in response to receiving said particular notification, the other host node invalidates a cached copy of the one or more data blocks in the respective cache of the other host node. An "invalid" copy of a data block indicates that the data block will not be written to the shared storage device or propagated through caches of the plurality of nodes, or otherwise treated as a valid copy.

At step 350, the other host node receives a request from a client device to read the one or more data blocks.

At step 360, in response to determining that the cached copy of the one or more data blocks in the cache of the other host node is invalid, the other host node reads the one or more data blocks from the shared storage device and transmits the one or more data blocks to the client device.

In an embodiment, the other host node determines, based on the lock being released by the particular host node, that the cached copy of the one or more data blocks in its cache is invalid. In response to determining that the cached copy of the one or more data blocks in the cache of the other host node is invalid, the other host node reads the one or more data blocks from the shared storage device and transmits the one or more data blocks to the client device. The other host node may also store the one or more data blocks from the shared storage device in the cache of the other host node and store an indication that the cached copy of the one or more data blocks in the cache of the other host node are valid.

Thus, a full update of data blocks is not sent between hosts every time a data block existing in shared storage is written to. Instead, as discussed above, a notification of an update to the data blocks in shared storage is sent between host nodes every time a data block is written to so that host nodes can mark the updated data block location as invalid. All future efforts to access the updated data blocks from the cache of a different host node result in a retrieval of the updated data blocks from the shared storage.

Technical Benefits

Using the fully active, non-replicated block storage solution as discussed above, the number of endpoints is not limited by the speed of the replication network and is not limited to a small number of host nodes. Unlike a full replication approach, full data is not sent over the replication network. Instead, a compact notifier of invalid data is sent over a network of host nodes allowing host nodes to read the invalid data from a dedicated storage connection if they require the data or ignore it if they don't.

Specifically, data block updates are done at the shared storage level and are efficiently communicated to other host nodes using a lightweight notification protocol that does not require replicating the update, which increases the availability of the processing power of a system, allowing for more uptime to service client requests. By sending mere notifications to participant host nodes of updates to data blocks, this approach avoids the pitfalls of an active with replication approach where, when adding endpoints to the cluster, eventually the sum total of the pathways through the host nodes overwhelms the ability to synchronize and replicate data blocks between host nodes. Under the fully active, non-replicated block storage solution, shared storage can be accessed over multiple pathways by a single client or by multiple clients. Thus, the only limitation of the active, non-replicated block storage solution is the speed of the storage access Additionally, each host node added to the set of host nodes increases the number of endpoints and bandwidth available to service client requests in a linear fashion, allowing for clients to utilize the full bandwidth of the shared storage. This allows for system implementations using cheaper, non-flash based host nodes and remote network protocols to approach the speed of newer flash based disks.

Furthermore, since the system can scale by adding new host nodes with new endpoints, the number of clients can also scale and does not have a limit. Speed of the clients is not limited to a small number of remote connections. Instead, the speed of the clients is limited to the aggregate of all available remote connections to the host nodes, which in turn is limited by the number of host nodes and their particular hardware configuration.

A VIP, as described herein, provides an opaque identifier to clients, leaving such clients unaware of the underlying topology of the sharing nodes. A VIP can move or be hosted anywhere, on any type of machines, storage pools, clusters, as long as the semantics of the storage protocol access through the VIP is honored. Thus, VIPs provide enhanced implementation flexibility in context of the above described methods.

Memory Overview

As used herein, "non-volatile" refers to a characteristic of a memory that retains data in the absence of any form of electrical power, including external or battery backup. Examples of non-volatile memory include e-prom memory, flash memory, and disk memory. Volatile memory refers to a characteristic of a memory for which power is retained by a battery backup in the absence of another external power source. For example, volatile memory coupled to a board with an embedded battery-backup is not non-volatile memory, because without the power provided by a battery, the volatile memory does not retain data.

Byte-addressable memory is distinguishable from block-addressable memory. A byte is eight bits and is the minimum amount of data that may be addressed, retrieved from memory, or written to in byte-addressable memory. Thus, to manipulate a bit in a byte, a byte containing the bit must be fetched to a register of processor executing a machine instruction that references the byte (or word containing the byte) and manipulated according to the machine instruction or another machine instruction.

In contrast, the minimum size for a unit of block-addressable memory is a data block. A data block comprises multiple bytes and multiple words and cannot be entirely stored within a register of processor. For block-addressable memory, a data block is the minimum amount of data that may be addressed, retrieved from memory, or written to memory. Examples of block-addressable memory include flash memory and disk memory. To manipulate a bit or a byte in a block, a block containing those bits is loaded into a byte-addressable memory by an instruction referencing the block issued to a block-based interface.

RAM is distinguishable from read-only memory (ROM) in that data in RAM can be overwritten. As used herein, overwriting data refers to replacing the data with new data without first having to erase the data in the memory. Thus, as used herein, RAM refers to byte-addressable memory that can be overwritten.

Implementation Mechanisms—Software Overview

Figure 4:
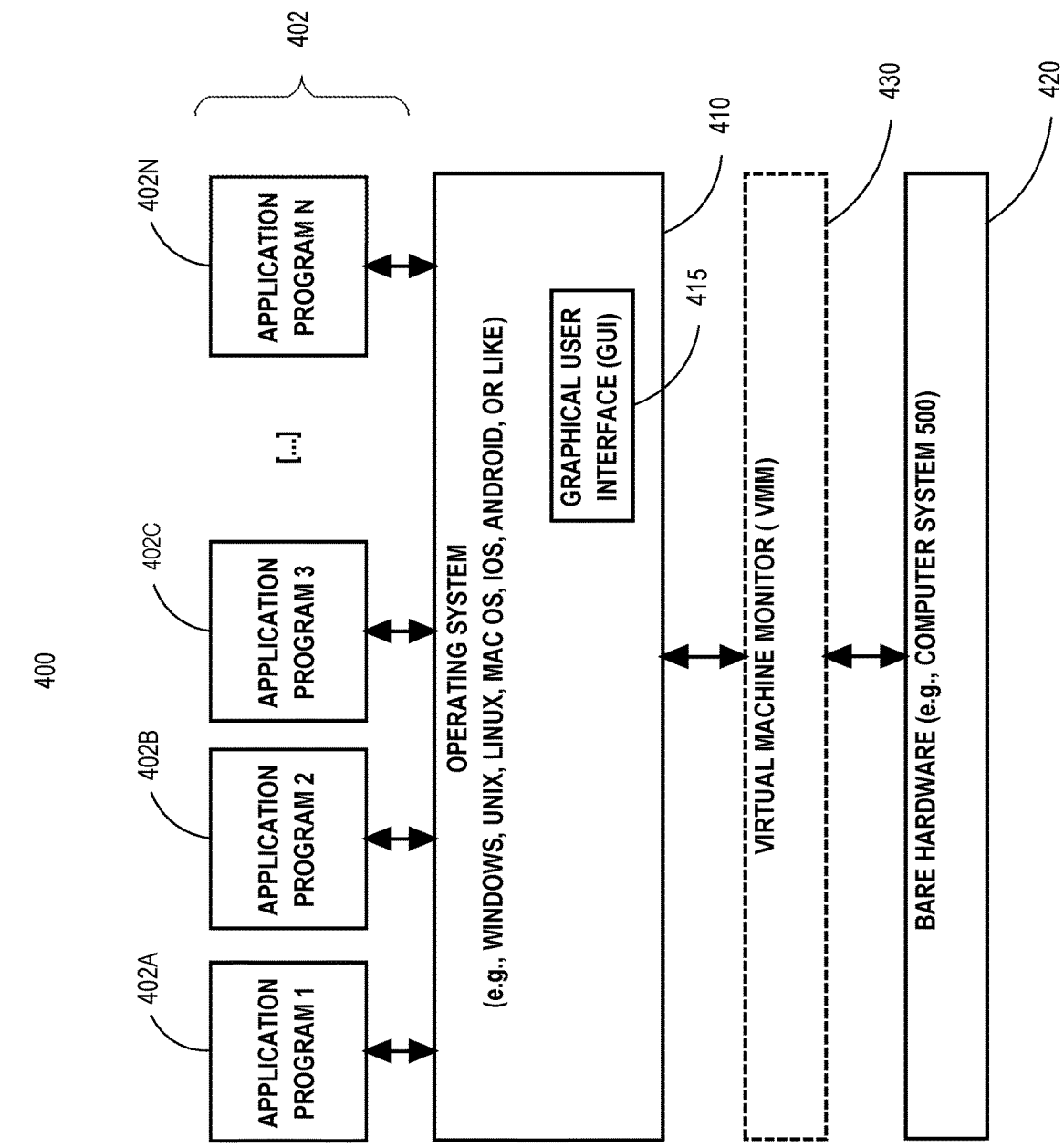
FIG. 4 is a diagram depicting a software system upon which an embodiment of the invention may be implemented.
Figure 5:
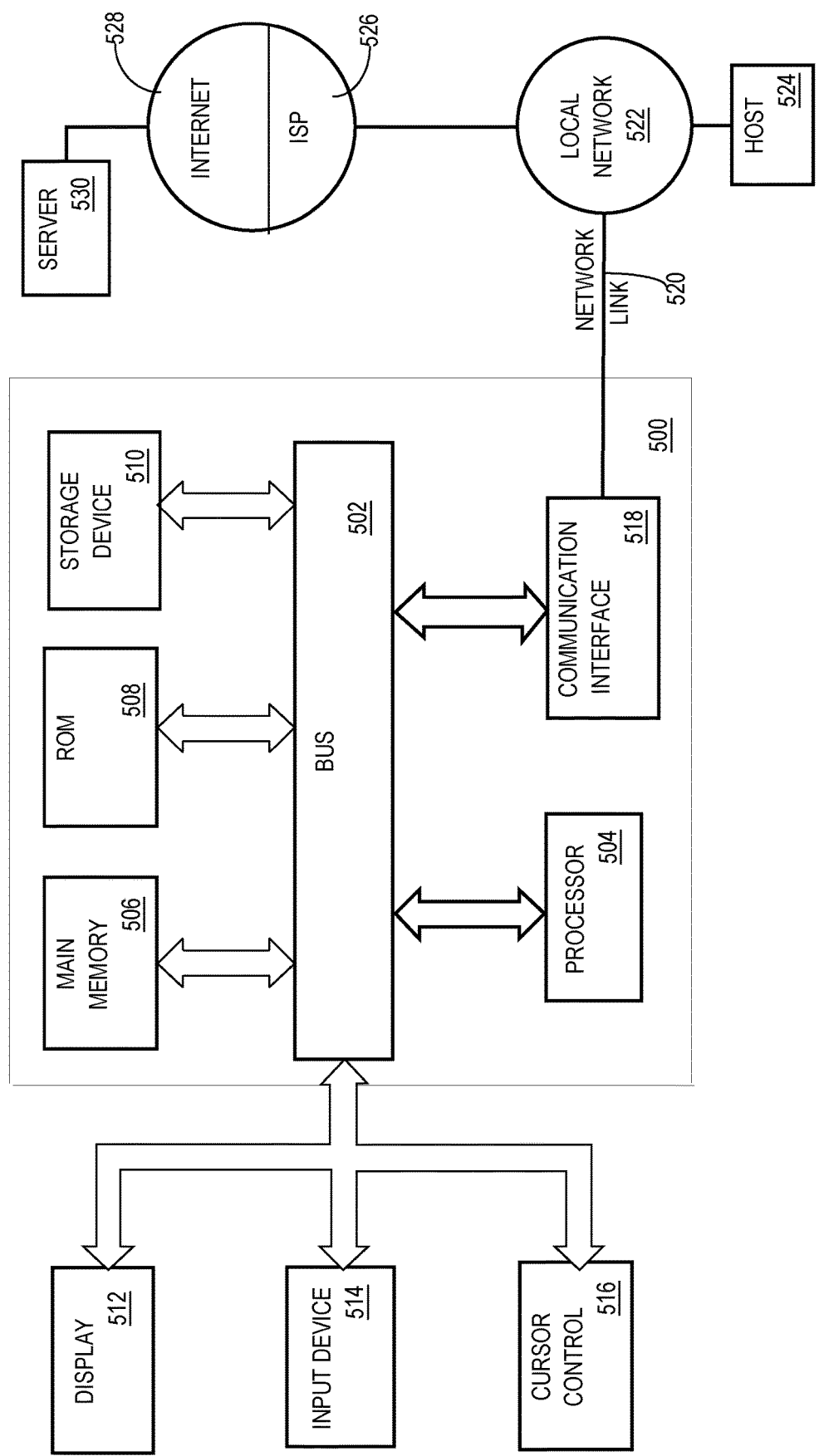
FIG. 5 is a block diagram that illustrates a computer system upon which an embodiment of the invention may be implemented.

FIG. 4 is a block diagram of a basic software system 400 that may be employed for controlling the operation of computing system 500 of FIG. 5. Software system 400 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 400 is provided for directing the operation of computing system 500. Software system 400, which may be stored in system memory (RAM) 506 and on fixed storage (e.g., hard disk or flash memory) 510, includes a kernel or operating system (OS) 410.

The OS 410 manages low-level aspects of computer operation, including managing execution of processes, memory allocation, file input and output (I/O), and device I/O. One or more application programs, represented as 402A, 402B, 402C . . . 402N, may be "loaded" (e.g., transferred from fixed storage 510 into memory 506) for execution by the system 400. The applications or other software intended for use on computer system 500 may also be stored as a set of downloadable computer-executable instructions, for example, for downloading and installation from an Internet location (e.g., a Web server, an app store, or other online service).

Software system 400 includes a graphical user interface (GUI) 415, for receiving user commands and data in a graphical (e.g., "point-and-click" or "touch gesture") fashion. These inputs, in turn, may be acted upon by the system 600 in accordance with instructions from operating system 410 and/or application(s) 402. The GUI 415 also serves to display the results of operation from the OS 410 and application(s) 402, whereupon the user may supply additional inputs or terminate the session (e.g., log off).

OS 410 can execute directly on the bare hardware 420 (e.g., processor(s) 504) of computer system 500. Alternatively, a hypervisor or virtual machine monitor (VMM) 430 may be interposed between the bare hardware 420 and the OS 410. In this configuration, VMM 430 acts as a software "cushion" or virtualization layer between the OS 410 and the bare hardware 420 of the computer system 500.

VMM 430 instantiates and runs one or more virtual machine instances ("guest machines"). Each guest machine comprises a "guest" operating system, such as OS 410, and one or more applications, such as application(s) 402, designed to execute on the guest operating system. The VMM 430 presents the guest operating systems with a virtual operating platform and manages the execution of the guest operating systems.

In some instances, the VMM 430 may allow a guest operating system to run as if it is running on the bare hardware 420 of computer system 500 directly. In these instances, the same version of the guest operating system configured to execute on the bare hardware 420 directly may also execute on VMM 430 without modification or reconfiguration. In other words, VMM 430 may provide full hardware and CPU virtualization to a guest operating system in some instances.

In other instances, a guest operating system may be specially designed or configured to execute on VMM 430 for efficiency. In these instances, the guest operating system is "aware" that it executes on a virtual machine monitor. In other words, VMM 430 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Multiple threads may run within a process. Each thread also comprises an allotment of hardware processing time but share access to the memory allotted to the process. The memory is used to store content of processors between the allotments when the thread is not running. The term thread may also be used to refer to a computer system process in multiple threads are not running.

Implementation Mechanisms—Hardware Overview

Referring now to FIG. 5, it is a block diagram that illustrates a computing device 500 in which the example embodiment(s) of the present invention may be embodied. Computing device 500 and its components, including their connections, relationships, and functions, is meant to be exemplary only, and not meant to limit implementations of the example embodiment(s). Other computing devices suitable for implementing the example embodiment(s) may have different components, including components with different connections, relationships, and functions.

Computing device 500 may include a bus 502 or other communication mechanism for addressing main memory 506 and for transferring data between and among the various components of device 500.

Computing device 500 may also include one or more hardware processors 504 coupled with bus 502 for processing information. A hardware processor 504 may be a general purpose microprocessor, a system on a chip (SoC), or other processor.

Main memory 506, such as a random access memory (RAM) or other dynamic storage device, also may be coupled to bus 502 for storing information and software instructions to be executed by processor(s) 504. Main memory 506 also may be used for storing temporary variables or other intermediate information during execution of software instructions to be executed by processor(s) 504.

Software instructions, when stored in storage media accessible to processor(s) 504, render computing device 500 into a special-purpose computing device that is customized to perform the operations specified in the software instructions. The terms "software", "software instructions", "computer program", "computer-executable instructions", and "processor-executable instructions" are to be broadly construed to cover any machine-readable information, whether or not human-readable, for instructing a computing device to perform specific operations, and including, but not limited to, application software, desktop applications, scripts, binaries, operating systems, device drivers, boot loaders, shells, utilities, system software, JAVASCRIPT, web pages, web applications, plugins, embedded software, microcode, compilers, debuggers, interpreters, virtual machines, linkers, and text editors.

Computing device 500 also may include read only memory (ROM) 508 or other static storage device coupled to bus 502 for storing static information and software instructions for processor(s) 504.

One or more mass storage devices 510 may be coupled to bus 502 for persistently storing information and software instructions on fixed or removable media, such as magnetic, optical, solid-state, magnetic-optical, flash memory, or any other available mass storage technology. The mass storage may be shared on a network, or it may be dedicated mass storage. Typically, at least one of the mass storage devices 510 (e.g., the main hard disk for the device) stores a body of program and data for directing operation of the computing device, including an operating system, user application programs, driver and other support files, as well as other data files of all sorts.

Computing device 500 may be coupled via bus 502 to display 512, such as a liquid crystal display (LCD) or other electronic visual display, for displaying information to a computer user. In some configurations, a touch sensitive surface incorporating touch detection technology (e.g., resistive, capacitive, etc.) may be overlaid on display 512 to form a touch sensitive display for communicating touch gesture (e.g., finger or stylus) input to processor(s) 504.

An input device 514, including alphanumeric and other keys, may be coupled to bus 502 for communicating information and command selections to processor 504. In addition to or instead of alphanumeric and other keys, input device 514 may include one or more physical buttons or switches such as, for example, a power (on/off) button, a "home" button, volume control buttons, or the like.

Another type of user input device may be a cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

While in some configurations, such as the configuration depicted in FIG. 5, one or more of display 512, input device 514, and cursor control 516 are external components (i.e., peripheral devices) of computing device 500, some or all of display 512, input device 514, and cursor control 516 are integrated as part of the form factor of computing device 500 in other configurations.

Functions of the disclosed systems, methods, and modules may be performed by computing device 500 in response to processor(s) 504 executing one or more programs of software instructions contained in main memory 506. Such software instructions may be read into main memory 506 from another storage medium, such as storage device(s) 510. Execution of the software instructions contained in main memory 506 cause processor(s) 504 to perform the functions of the example embodiment(s).

While functions and operations of the example embodiment(s) may be implemented entirely with software instructions, hard-wired or programmable circuitry of computing device 500 (e.g., an ASIC, a FPGA, or the like) may be used in other embodiments in place of or in combination with software instructions to perform the functions, according to the requirements of the particular implementation at hand.

The term "storage media" as used herein refers to any non-transitory media that store data and/or software instructions that cause a computing device to operate in a specific fashion. Such storage media may comprise non-volatile media and/or volatile media. Non-volatile media includes, for example, non-volatile random access memory (NVRAM), flash memory, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, flash memory, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or electromagnetic waves, such as those generated during radio-wave and infra-red data communications.

Various forms of media may be involved in carrying one or more sequences of one or more software instructions to processor(s) 504 for execution. For example, the software instructions may initially be carried on a magnetic disk or solid-state drive of a remote computer. The remote computer can load the software instructions into its dynamic memory and send the software instructions over a telephone line using a modem. A modem local to computing device 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor(s) 504 retrieves and executes the software instructions. The software instructions received by main memory 506 may optionally be stored on storage device(s) 510 either before or after execution by processor(s) 504.

Computing device 500 also may include one or more communication interface(s) 518 coupled to bus 502. A communication interface 518 provides a two-way data communication coupling to a wired or wireless network link 520 that is connected to a local network 522 (e.g., Ethernet network, Wireless Local Area Network, cellular phone network, Bluetooth wireless network, or the like). Communication interface 518 sends and receives electrical, electromagnetic, or optical signals that carry digital data streams representing various types of information. For example, communication interface 518 may be a wired network interface card, a wireless network interface card with an integrated radio antenna, or a modem (e.g., ISDN, DSL, or cable modem).

Network link(s) 520 typically provide data communication through one or more networks to other data devices. For example, a network link 520 may provide a connection through a local network 522 to a host computer 524 or to data equipment operated by an Internet Service Provider (ISP) 526. ISP 526 in turn provides data communication services through the world wide packet data communication network now commonly referred to as the "Internet" 528. Local network(s) 522 and Internet 528 use electrical, electromagnetic or optical signals that carry digital data streams. The signals through the various networks and the signals on network link(s) 520 and through communication interface(s) 518, which carry the digital data to and from computing device 500, are example forms of transmission media.

Computing device 500 can send messages and receive data, including program code, through the network(s), network link(s) 520 and communication interface(s) 518. In the Internet example, a server 530 might transmit a requested code for an application program through Internet 528, ISP 526, local network(s) 522 and communication interface(s) 518.

The received code may be executed by processor 504 as it is received, and/or stored in storage device 510, or other non-volatile storage for later execution.

Other Aspects of Disclosure

Although some of the figures described in the foregoing specification include flow diagrams with steps that are shown in an order, the steps may be performed in any order, and are not limited to the order shown in those flowcharts. Additionally, some steps may be optional, may be performed multiple times, and/or may be performed by different components. All steps, operations and functions of a flow diagram that are described herein are intended to indicate operations that are performed using programming in a special-purpose computer or general-purpose computer, in various embodiments. In other words, each flow diagram in this disclosure, in combination with the related text herein, is a guide, plan or specification of all or part of an algorithm for programming a computer to execute the functions that are described. The level of skill in the field associated with this disclosure is known to be high, and therefore the flow diagrams and related text in this disclosure have been prepared to convey information at a level of sufficiency and detail that is normally expected in the field when skilled persons communicate among themselves with respect to programs, algorithms and their implementation.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:

associating each host node of a plurality of host nodes with a respective virtual IP address (VIP) of a plurality of VIPs;

wherein each host node of said plurality of host nodes shares access to a shared storage device;

based on said associating each host node of said plurality of host nodes with a respective VIP, for each host node of said plurality of host nodes, directing a write request of a plurality of write requests issued to the respective VIP associated with said each host node to said each host node;

wherein a first write request of said plurality of write requests is received by a first host node of the plurality of host nodes, said first write request being a request to write first one or more data blocks, said first host node being associated with a first VIP of said plurality of VIPs;

in response to the first write request, the first host node storing the first one or more data blocks in said shared storage device and transmitting a particular notification to another host node of the plurality of host nodes, the particular notification indicating that said first host node stored the first one or more data blocks in said shared storage device;

in response to receiving said particular notification, said another host node invalidating a cached copy of each of the first one or more data blocks stored by said first host node in said shared storage device;

associating said first VIP with a second host node of said plurality of host nodes, wherein the second host node is different from the first host node;

in response to associating said first VIP with a second host node of said plurality of host nodes, the second host node receiving a second write request issued to the first VIP to write a second one or more data blocks;

in response to the second write request, the second host node storing the second one or more data blocks in said shared storage device.

2. The method of claim 1, further comprising:

receiving, by said another host node, a read request to read a particular data block of the first one or more data blocks;

in response to said another host node determining that a cached copy of said particular data block of the first one or more data blocks is invalid, said another host node reading the particular data block of the first one or more data blocks from the shared storage device.

3. The method of claim 1, wherein a mapping is maintained by a name server that maps each host node of the plurality of host nodes to a VIP of said plurality of VIPs.

4. The method of claim 1, wherein a cache of said first host node comprises volatile memory and stores cached copies of the first one or more data blocks in the volatile memory of said cache.

5. The method of claim 1, wherein a notification is not sent to each host node of the plurality of host nodes that does not store a cached copy of the first one or more data blocks.

6. The method of claim 1, wherein said first host node transmitting the particular notification includes the first host node transmitting the particular notification in response to obtaining a lock on said first one or more data blocks.

7. A non-transitory computer-readable storage medium storing sequences of instructions that, when executed by one or more processors, cause:

associating each host node of a plurality of host nodes with a respective virtual IP address (VIP) of a plurality of VIPs;

wherein each host node of said plurality of host nodes shares access to a shared storage device;

based on said associating each host node of said plurality of host nodes with a respective VIP, for each host node of said plurality of host nodes, directing a write request of a plurality of write requests issued to the respective VIP associated with said each host node to said each host node;

wherein a first write request of said plurality of write requests is received by a first host node of the plurality of host nodes, said first write request being a request to write first one or more data blocks, said first host node associated with a first VIP of said plurality of VIPs;

in response to the first write request, the first host node storing the first one or more data blocks in said shared storage device and transmitting a particular notification to another host node of the plurality of host nodes, the particular notification indicating that said first host node stored the first one or more data blocks in said shared storage device;

in response to receiving said particular notification, said another host node invalidating a cached copy of each of the first one or more data blocks stored by said first host node in said shared storage device;

associating said first VIP with a second host node of said plurality of host nodes, wherein the second host node is different from the first host node;

in response to associating said first VIP with a second host node of said plurality of host nodes, the second host node receiving a second write request issued to the first VIP to write a second one or more data blocks;

in response to the second write request, the second host node storing the second one or more data blocks in said shared storage device.

8. The non-transitory computer-readable storage medium of claim 7, the sequences of instructions including instructions that, when executed by the one or more processors, cause:

receiving, by said another host node, a read request to read a particular data block of the first one or more data blocks;

in response to said another host node determining that a cached copy of said particular data block of the first one or more data blocks is invalid, said another host node reading the particular data block of the first one or more data blocks from the shared storage device.

9. The non-transitory computer-readable storage medium of claim 7, wherein a mapping is maintained by a name server that maps each host node of the plurality of host nodes to a VIP of said plurality of VIPs.

10. The non-transitory computer-readable storage medium of claim 7, wherein a cache of said first host node comprises volatile memory and stores cached copies of the first one or more data blocks in the volatile memory of said cache.

11. The non-transitory computer-readable storage medium of claim 7, wherein a notification is not sent to each host node of the plurality of host nodes that does not store a cached copy of the first one or more data blocks.

12. The non-transitory computer-readable storage medium of claim 7, wherein said first host node transmitting the particular notification includes the first host node transmitting the particular notification in response to obtaining a lock on said first one or more data blocks.

* * * * *